United States Patent [19]

Darr

[11] Patent Number: 4,585,408

[45] Date of Patent: Apr. 29, 1986

[54] IN-MOLD LABEL DISPENSER FOR PLASTIC BLOW MOLDING MACHINE

[75] Inventor: Richard C. Darr, Seville, Ohio

[73] Assignee: Plastipak Packaging, Inc., Plymouth, Mich.

[21] Appl. No.: 722,317

[22] Filed: Apr. 11, 1985

[51] Int. Cl.$^4$ .............. B29C 5/06; B29C 27/04; B29C 17/07; B65H 3/08

[52] U.S. Cl. .................. 425/171; 425/150; 425/503; 425/504; 425/522; 425/539

[58] Field of Search ............... 425/503, 504, 522, 539, 425/126 R, 150, 171

[56] References Cited

U.S. PATENT DOCUMENTS

| | | |
|---|---|---|
| 3,292,209 | 12/1966 | Borkmann . |
| 3,324,508 | 6/1967 | Dickinson . |
| 4,355,967 | 10/1982 | Hellmer . |
| 4,359,314 | 11/1982 | Hellmer . |
| 4,397,625 | 8/1983 | Hellmer et al. . |
| 4,479,644 | 10/1984 | Bartimes et al. . |
| 4,479,770 | 10/1984 | Slat et al. . |
| 4,479,771 | 10/1984 | Slat et al. ........................... 425/503 |
| 4,498,854 | 2/1985 | Ross ............................... 425/522 X |
| 4,501,548 | 2/1985 | Jahnel ............................. 425/504 X |
| 4,549,863 | 10/1985 | Bourgeois ........................ 425/503 X |

Primary Examiner—J. Howard Flint, Jr.
Attorney, Agent, or Firm—Brooks & Kushman

[57] ABSTRACT

An in-mold label dispenser (10) for a plastic blow molding machine (12) is disclosed as including a base (24) on which label magazines (26) are mounted along with a subbase (34) which is moved by a first actuator (40) between aligned and transfer positions with respect to open mold sections (16) of the mold (14). A shuttle (42) of the dispenser has label carriers (44) thereon and is movable with the subbase movement as well as being movable toward and away from the mold (14) by a second actuator (46) that moves with the subbase under the operation of the first actuator (40). An enlongated support (36) preferably mounts the shuttle (42) for sliding movement under the impetus of the second actuator (46) between a withdrawn position adjacent the label magazines (26) and an inserted position where the labels received by the label carriers (44) are aligned with cavity sections (18) of the mold to deposit the labels upon operation of the first actuator (40). Both the first and second actuators (40) and (46) are preferably embodied by air cylinders whose extending and retracting movements respectively move the subbase (34) and the shuttle (42) to provide the in-mold labeling operation.

18 Claims, 6 Drawing Figures

IN-MOLD LABEL DISPENSER FOR PLASTIC BLOW MOLDING MACHINE

TECHNICAL FIELD

This invention relates to an in-mold label dispenser for a plastic blow molding machine and has particular utility for use with a multiple cavity mold type of blow molding to supply at least one label to each cavity during each blow molding cycle.

BACKGROUND ART

Blow molding machines conventionally provide a parison, i.e. a tube of hot plastic, between open sections of a mold. Closing of the mold then clamps the parison and allows air to be blown into the parison such that it assumes the shape of the mold. After suitable cooling has taken place, the mold sections are opened to allow ejection of the molded part.

Blow molded parts such as containers have conventionally included paper labels that are glued thereto after the molding to identify the contents of the container to the consumer. One problem is that such paper labels can become wrinkled if dampened and can also become detached from the container if a waterproof glue is not used. Also, paper labels require a separate labeling step after the molding which thus adds to the cost of the container.

In-mold labeling has been developed in the recent past to provide superior bonding of labels to blow molded plastic parts. This in-mold labeling is performed by initially inserting a label within the mold prior to the introduction of the parison and by subsequently closing sections of the mold in preparation for the blowing operation. The subsequent blowing operation forms the parison around the label to the shape of the mold and provides a permanent bond which is incapable of being broken by moisture or otherwise. Also, such in-mold labeling provides a smooth transition between the label and the adjacent surface of the molded plastic part and further provides additional strength since the label cooperates with the plastic in resisting deformation. Such strengthening also allows the use of less plastic to blow mold the part and thereby reduces the ultimate cost to the consumer. Furthermore, when utilized with containers for carbonated beverages, it is believed that in-mold labeling may reduce the flow of carbon dioxide out through the container wall over a period of time and thereby increases the shelf like.

Prior in-mold label dispensers for blow molding machines conventionally include a label carrier having a vacuum cup that receives a label from a label magazine and is then moved to deposit the label within the mold cavity whereupon termination of a vacuum drawn at the suction cup allows a vacuum drawn at the mold cavity to secure the label in position in preparation for the molding. Such vacuum type label carriers have previously been mounted on linkages that move the labels in an angular path with respect to the direction of opening and closing movement of mold sections of the mold in order to permit depositing of the labels in the confined space permitted by the extent of the mold opening. With the linkage type of label carrier, only one label can be deposited within the mold at a given time since movement thereof on the linkage toward one mold section interferes with movement of a similar linkage toward an opposed mold section for depositing another label.

Another prior art type of in-mold label dispenser is disclosed by U.S. Pat. Nos. 4,355,967 and 4,359,314 and includes a label carrier that is moved along an abruptly curved path by a complex linkage which executes a 180 degree turn in order to transfer labels from a label magazine to the mold in preparation for molding. With this complex linkage type label dispenser, it is likewise not possible to deposit more than one label in the mold at a given time due to the limited space present upon opening of the mold.

With both of the above prior art type of in-mold label dispensers, the cycle time of the blow molding machine is increased due to the necessity of depositing labels sequentially rather than at the same time when more than one label is to be applied to each mold.

U.S. Pat. Nos. 3,292,209 and 4,397,625 each disclose an in-mold label dispenser wherein one fluid motor moves a label carriage from adjacent the mold to between the open mold sections and wherein one or more additional fluid motors supported on the label carriage move label carriers on the carriage to transfer labels from label stacks into the mold.

U.S. Pat. No. 3,324,508 discloses an in-mold label dispenser wherein a linkage moves labels from rolls of labels to a mold where the labels are held by an electrostatic charge prior to the blow molding operation.

U.S. Pat. Nos. 4,479,770 and 4,479,771 of William A. Slat, et al disclose in-mold label dispensers wherein a first solid mechanical drive moves a dispensing head between inserted and withdrawn positions with respect to an open mold and wherein a second solid mechanical drive extends and retracts label carriers in order to perform the labeling operation. Use of such solid mechanical drives to move the dispensing head and the label carriers permits accurate positioning of the labels.

U.S. Pat. No. 4,479,644 discloses another type of in-mold label dispenser for use with a plastic blow molding machine.

DISCLOSURE OF INVENTION

An object of the present invention is to provide an approved in-mold label dispenser for use with a plastic blow molding machine and being usable generally with a single cavity mold to provide in-mold labeling, but having particular utility with a multiple cavity mold to provide in-mold labeling of each cavity during each cycle of the blow molding operation.

The plastic blow molding machine with which the in-mold label dispenser is utilized includes a mold having a pair of mold sections each of which includes at least one cavity section. These cavity sections of the mold are movable toward and away from each other between an open position spaced from each other and a closed position where the cavity sections thereof cooperate to define at least one enclosed cavity in which blow molding is performed.

In carrying out the object of the invention, the in-mold label dispenser utilized with the plastic blow molding machine includes a base and at least one label magazine mounted on the base adjacent the mold. A label transfer mechanism of the dispenser includes a subbase movably mounted on the base and also includes a first actuator that moves the subbase between an aligned position with respect to the open mold sections and a transfer position. A shuttle is mounted for movement with the subbase under the impetus of the first actuator and for movement therewith and is movable with respect thereto toward and away from the mold. At least one label carrier is mounted on the shuttle in a fixed relationship with respect thereto and is operable to carry a label for transfer from the label magazine to the mold. A second actuator is mounted for movement on the subbase and is connected to the shuttle to move the shuttle between withdrawn and inserted positions with respect to the mold. The shuttle is located adjacent the label magazine in the withdrawn position to permit the label carrier thereon to receive a label from the label magazine. The second actuator then moves the shuttle to the inserted position with the subbase in the aligned position to position the label carrier and the label carried thereby between the mold sections of the open mold. Thereafter, the first actuator moves the subbase to the transfer position to transfer the label on the label carrier of the shuttle to one of the mold sections prior to movement of the subbase back to the aligned position and movement of the shuttle back to the withdrawn position in preparation for the next cycle. A control of the dispenser coordinates the operation of the first and second actuators to transfer at least one label from the label magazine to the mold during each blow molding cycle of the machine.

As previously mentioned, the in-mold label dispenser has particular utility when utilized with a multiple cavity type mold in which a plurality of blow molded parts are formed during each cycle. In order to provide at least one label to each cavity during each cycle, the label dispenser includes a plurality of label magazines mounted on the base and also includes a like number plurality of label carriers that respectively receive labels from the magazines to supply the labels to the multiple cavity type mold during the in-mold labeling operation under the control of the first and second actuators.

In the disclosed construction of the in-mold label dispenser, the label magazines are fixedly mounted on the base and are located so as to supply labels to the label carriers on the shuttle upon movement of the subbase from the aligned position to the transfer position with the shuttle in the withdrawn position with respect to the mold. However, it should be understood that it is also possible to move the label magazines toward and away from the label carriers with the shuttle in the withdrawn position in order to initially transfer the labels to the label carriers in preparation for the shuttle movement into the inserted position between the mold sections for the in-mold labeling operation. It should also be mentioned that more than one label can be supplied to each mold cavity if it is desired to apply more than one label to the associated side of the blow molded article. Also, an adjustable mount preferably is utilized for fixedly mounting the label magazines on the base. Such an adjustable mount for the label magazines controls the locations at which the labels are received by the label carriers and the ultimate locations at which the labels are received by the mold.

In its preferred construction, the in-mold label dispenser includes a support that pivotally mounts the subbase on the base for pivotal movement between the aligned and transfer positions. The first actuator is preferably constructed as an air cylinder having one end connected to the base and another end connected to the subbase. The first air cylinder actuator is retractable and extendable to pivot the subbase about the support between the aligned and transfer positions during the in-mold labeling operation.

Accurate positioning of the labels within a mold is achieved by the preferred construction of the in-mold label dispenser wherein the support has an elongated construction extending across the mold on one side thereof in a spaced relationship to the mold. The shuttle is mounted on the elongated support for both pivoting and sliding movement. The second actuator is also preferably embodied by an extendable and retractable air cylinder and has one end connected to the subbase and another end connected to the shuttle. This connection between the subbase and the shuttle by the second air cylinder actuator pivots the shuttle with the subbase about the actuator pivots the shuttle with the subbase about the elongated support between the aligned and transfer positions and also slides the shuttle along the elongated support between the withdrawn and inserted positions during the retraction and extension of the second air cylinder actuator.

The second air cylinder actuator also preferably includes a sensor for sensing the extension thereof to provide a control signal for indicating that the shuttle is in the inserted position with the label carriers between the open mold sections. The elongated support includes opposite end mounts for providing mounting thereof on the base on opposite sides of the mold, and the sensor of the second air cylinder actuator is located on the mount on the opposite side of the mold from the pivotal subbase.

A compact and effective construction of the in-mold label dispenser is provided with the first air cylinder actuator connected to the subbase on the opposite side of the support from the label carriers. This most preferred construction of the in-mold label dispenser also preferably has the second air cylinder actuator extending parallel to the elongated support on the opposite side thereof as the label carriers. Furthermore, the second air cylinder actuator includes a cylinder body that is preferably mounted on the subbase and also includes a piston connecting rod that extends from the cylinder body thereof to the shuttle to provide the connection between the subbase and the shuttle.

The objects, features, and advantages of the present invention are readily apparent from the following detailed description of the best mold for carrying out the invention when taken in connection with the accompanying drawings.

BEST MODE FOR CARRYING OUT THE INVENTION

Figure 1:
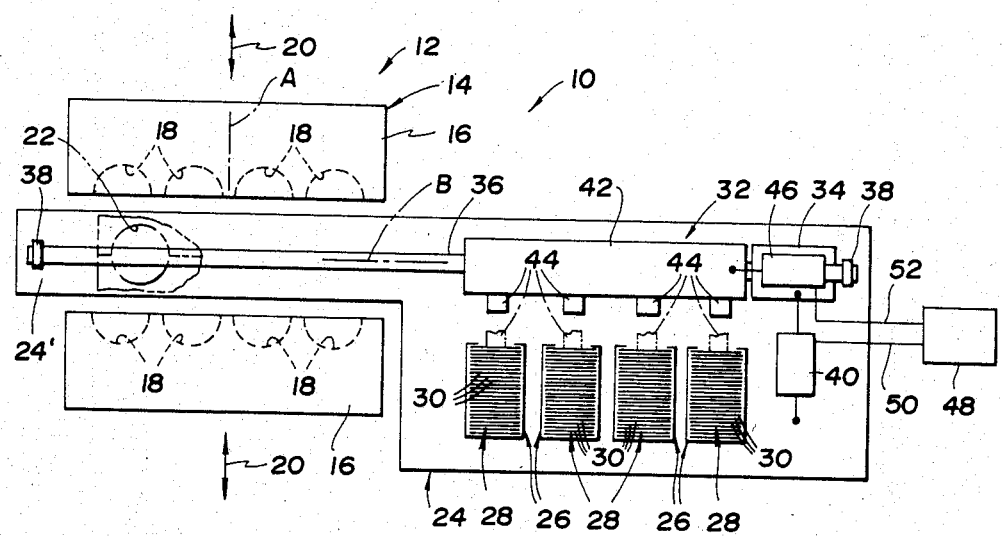
FIG. 1 is a top plan schematic view of the mold of a plastic blow molding machine and an in-mold label dispenser constructed in accordance with the present invention with a shuttle thereof shown in a withdrawn position with respect to the mold adjacent label magazines that supply labels to label carriers on the shuttle in preparation for the in-mold labeling operation.
Figure 2:
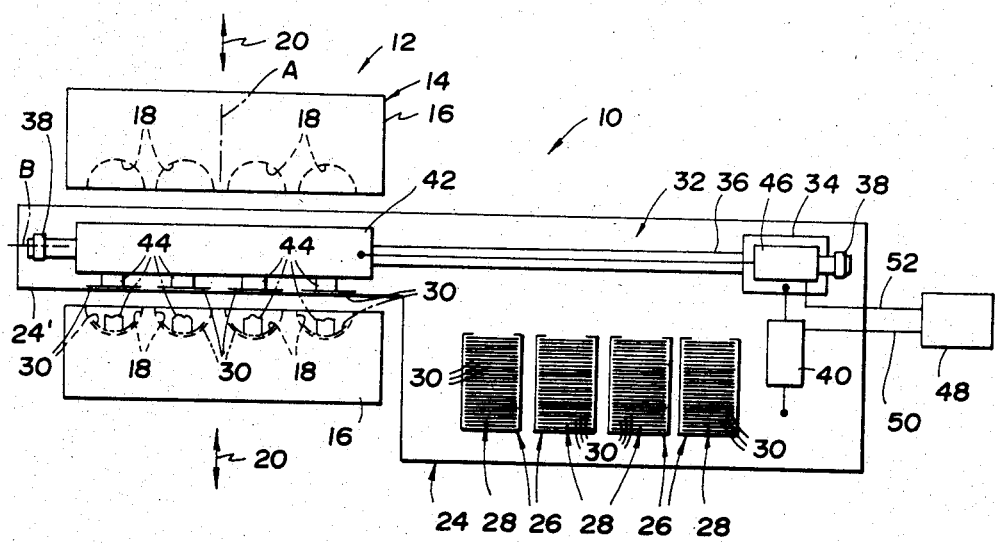
FIG. 2 is a view similar to FIG. 1 but with the shuttle shown moved to an inserted position between the open mold sections of the mold with labels carried by the label carriers thereon to provide transfer of the labels to the mold in preparation for the blow molding operation of the machine in a conventional manner.

With reference to the schematic views of FIGS. 1 and 2 of the drawings, an in-mold label dispenser 10 constructed in accordance with the present invention is utilized with a plastic blow molding machine 12 including a mold 14 having a pair of mold sections 16. Mold 14 is disclosed as being of the multiple cavity type with each mold section 16 including a plurality of cavity sections 18. While the in-mold label dispenser has particular utility for use with multiple cavity type molds like mold 14 for reasons which will be hereinafter apparent, it should be appreciated that this in-mold label dispenser 10 can also be utilized with a single cavity mold to provide at least one label to one of the cavity sections thereof prior to the blow molding operation. Mold sections 16 of the mold 14 are movable along an axis A as indicated by arrows 20 toward and away from each other. In the open position illustrated by solid line representation in FIG. 1, the mold sections 16 are spaced from each other to permit ejection of previously molded parts and introduction of labels into the cavity sections 18 of one mold section 16 in preparation for the next cycle. In the closed position illustrated by phantom line representation in FIG. 1, each pair of opposed cavity sections 18 cooperate to define an enclosed cavity 22 in which the blow molding is performed.

In-mold label dispenser 10 illustrated in FIG. 2 includes a base 24 of a construction that is hereinafter more fully described. A plurality of label magazines 26 corresponding to the number of cavity sections 18 in each mold section 16 are mounted on the base 24 adjacent the mold 14 and each includes a stack 28 of labels 30 to be supplied to the mold 14. A label transfer mechanism 32 is also mounted on the base 24 and is operable to transfer the labels 30 from the magazines 26 to the mold cavity sections 18 as is hereinafter more fully described.

Label transfer mechanism 32 illustrated in FIGS. 1 and 2 includes a subbase 34 that is movably mounted on the base 24 preferably in a pivotal manner about an axis B on an elongated support 36 whose opposite ends are fixed on the base by mounts 38 on opposite sides of mold 14 as is hereinafter more fully described. A first actuator 40 extends between the base 24 and the subbase 34 and is operable as is hereinafter described to move the subbase between an aligned position with respect to the open mold sections and a transfer position.

A shuttle 42 of the label transfer mechanism 32 is mounted for movement with the subbase 34 under the impetus of the first actuator 40 and is also mounted for movement with respect to the subbase toward and away from the mold 14. A plurality of label carriers 44 are mounted on the shuttle 42 in a fixed relationship with respect thereto and are operable to transfer labels 30 from respect thereto and are operable to transfer labels 30 from the label stacks 28 in the label magazines 26 to the mold 14 to provide in-mold labeling prior to the blow molding operation of machine 12. A second actuator 46 is mounted for movement with the subbase 34 and is connected to the shuttle 42 to move the shuttle between withdrawn and inserted positions with respect to the mold 14.

In the withdrawn position as illustrated in FIG. 1, the shuttle 42 is located adjacent the label magazines 26 to permit the label carriers 44 thereon to receive labels 30 from the labels stacks 28. The actuator 46 with the subbase 34 positioned in the aligned position by the first actuator 40 then moves the shuttle 42 to the inserted position illustrated in FIG. 2 to position the label carriers 44 in alignment with one set of cavities sections 18 at a location between the mold sections 16 of the open mold 14. The first actuator 40 thereafter moves the subbase 34 to the transfer position to thereby move the shuttle 42 and position the label carriers 44 in the phantom line indicated position in FIG. 2 with the labels 30 positioned adjacent the walls of the associated mold cavity sections 18. A vacuum that is utilized to hold the labels 30 on the label carriers 44 is then terminated and a vacuum drawn at the walls of the cavity sections 18 transfers the labels to the mold 14 in preparation for the blow molding operation. The subbase 34 is then moved back to the aligned position by the first actuator 40 and the shuttle 42 is thereafter moved from the inserted position of FIG. 2 to the withdrawn position of FIG. 1 by the second actuator 46 in preparation for the next cycle.

A schematically indicated control 48 of the in-mold label dispenser 10 has a first connection 50 to the first actuator 40 and a second connection 52 to the second actuator 46. Suitable circuitry of the control 48 through the first and second connections 50 and 52 controls operation of the first and second actuators 40 and 42 to provide the movement of the subbase 34 and the shuttle 42. Such control of the subbase and shuttle movement as described above transfers the labels 30 from the label magazines 26 to the mold 14 to provide at least one label to each mold cavity during each blow molding cycle of the machine.

As previously mentioned, the in-mold label dispenser 10 is illustrated for use with a multiple cavity mold 14 and includes a plurality of the label magazines 26 corresponding in number to the number of the cavity sections 18 of each mold section 16. A like number of label carriers 44 are also provided on the shuttle 42 as previously described so as to supply labels to the multiple cavity type mold 14 of the blow molding machine 12. It should also be mentioned that the label carriers 44 can be constructed so as to provide more than one label to each cavity section 18 if it is desirable to have more than one label on the associated side of the blow molded article. It is likewise possible for the in-mold label dispenser 10 to incorporate a pair of the label transfer mechanisms 32 that are respectively associated with each of the two mold sections 16 in order to supply labels to both sets of cavity sections 18 for labeling of opposite sides of the blow molded articles.

Figure 3:
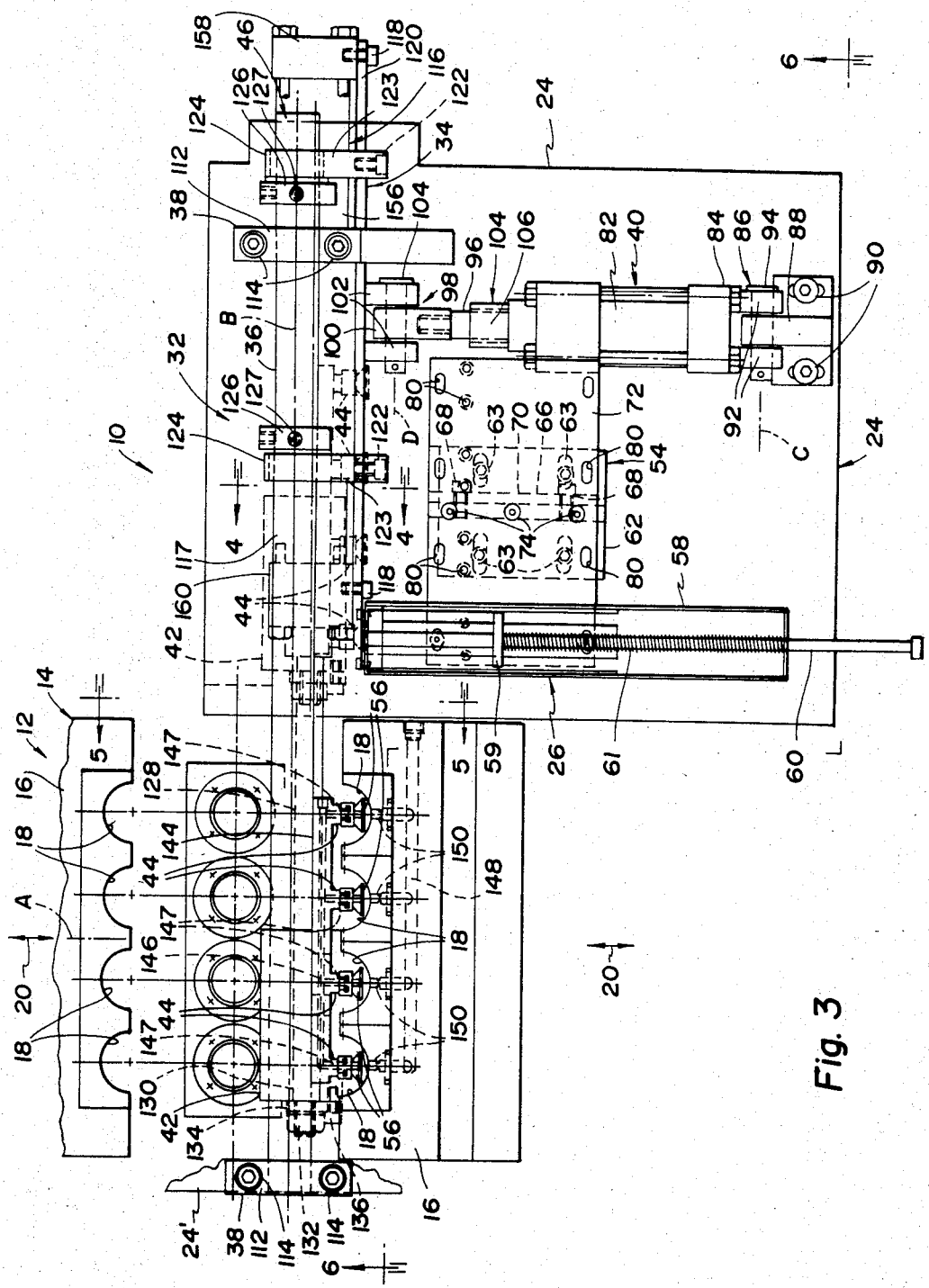
FIG. 3 is a detailed top plan view similar to the schematic view of FIG. 2 and illustrates the open mold and the in-mold label dispenser of the invention.
Figure 4:
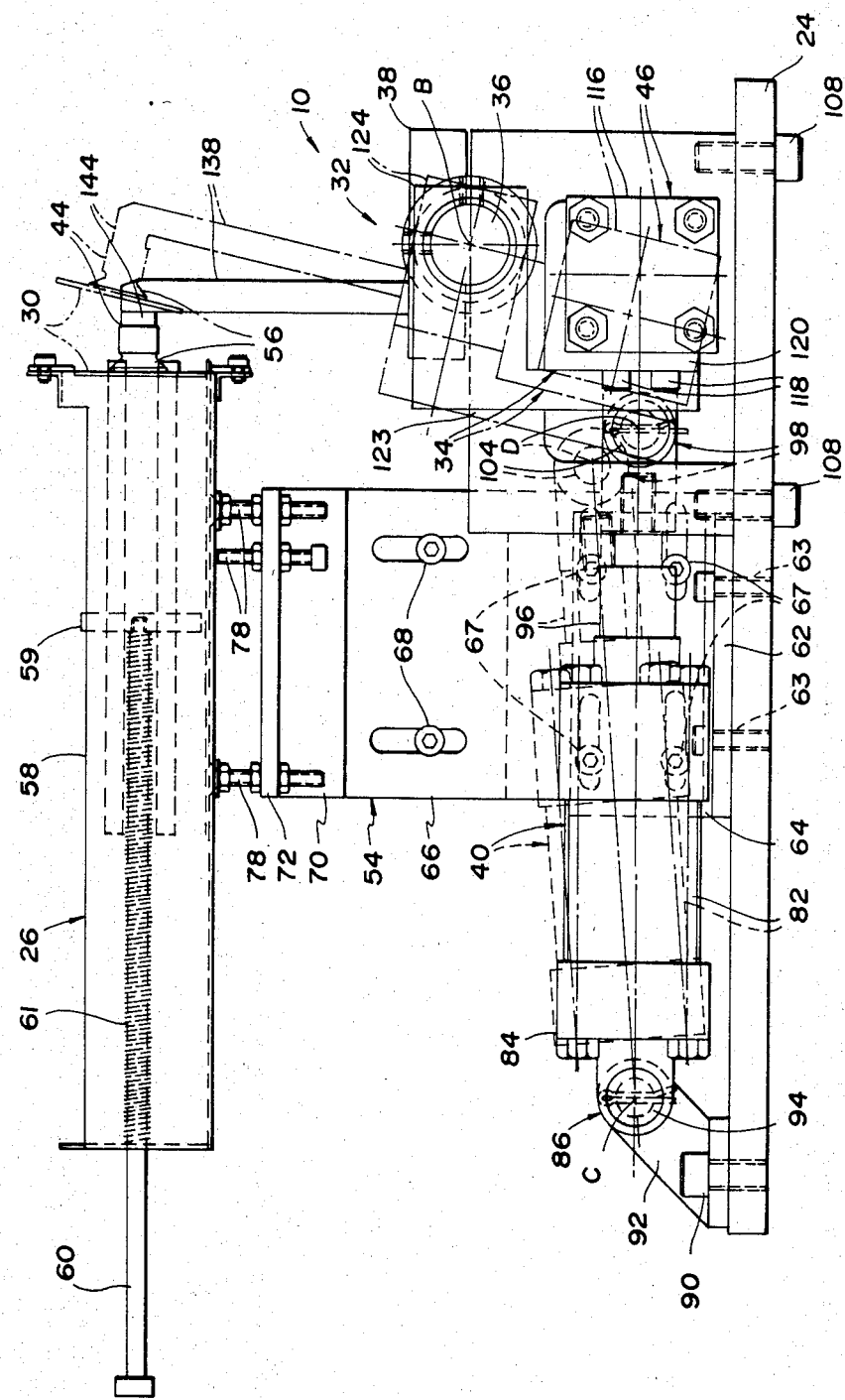
FIG. 4 is an elevation view taken along the direction of line 4—4 in FIG. 3 to illustrate the operation of the in-mold label dispenser when labels are initially received by label carriers thereof in preparation for the label transfer to the mold.
Figure 6:
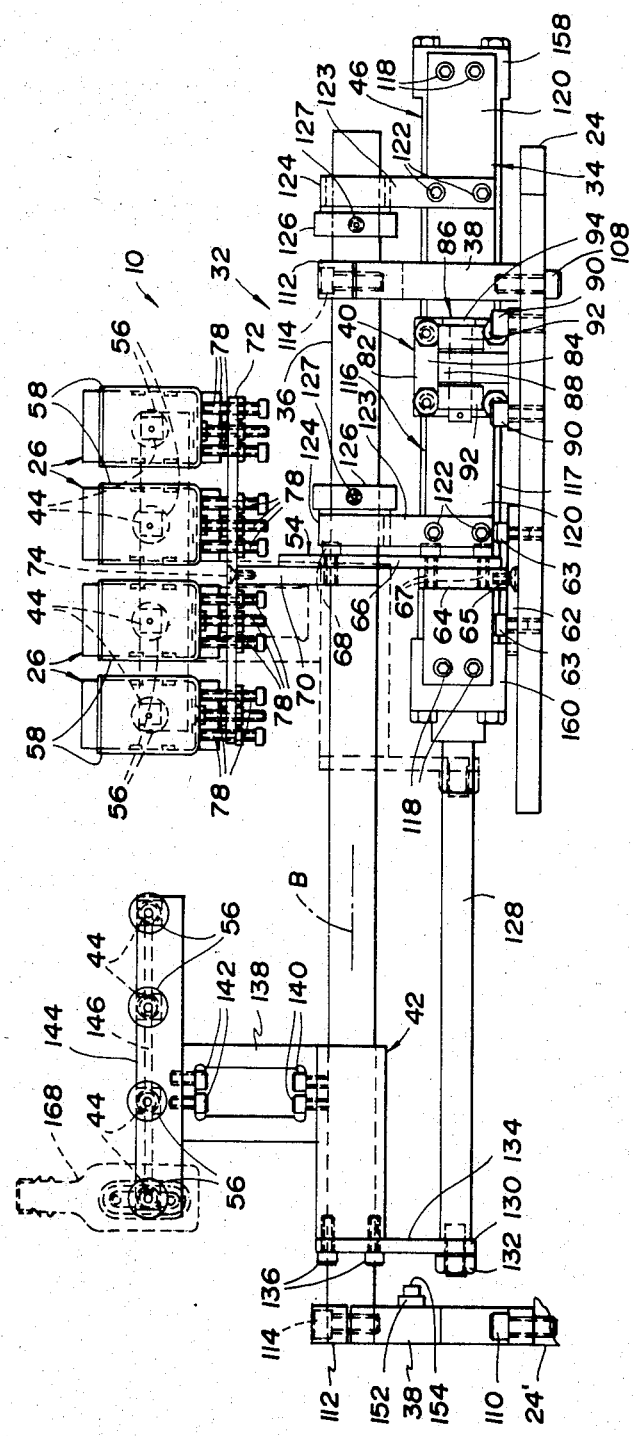
FIG. 6 is an elevation view of the in-mold label dispenser taken along the direction of line 6—6 in FIG. 3 to further illustrate its construction.

With reference to FIGS. 3, 4, and 6, the label magazines 26 are fixedly mounted on the base 24 by an upwardly projecting mount generally indicated by 54. With the label magazines 26 fixedly mounted as illustrated, the subbase 34 with the shuttle 42 in the withdrawn position is moved from the aligned position to the transfer position to move the label carriers 44 from the phantom line indicated position of FIG. 4 to the solid line indicated position. In this transfer position, a vacuum cup 56 of each label carrier 44 is engaged with the exposed label 30 of the aligned label stack 28 to receive the label therefrom prior to movement of the subbase back to the aligned position with the shuttle in the withdrawn position with respect to the mold. Such operation provides the label carriers 44 with labels in preparation for the shuttle movement that transfers the labels to the mold as previously described. While the fixed mounting of the label magazines described is preferred, it should be appreciated that it is also possible to movably mount the label magazines to supply the labels to the label carriers 44 without any movement of the subbase in the withdrawn position.

As best illustrated in FIGS. 3 and 4, each label magazine 26 includes an elongated housing 58 in which a plunger 59 is received. A guide rod 60 extends from one end of the housing 58 to the plunger 59 and is encircled by a helical spring 61 that biases the plunger and hence the associated stack of labels toward the label carriers 44. The end of the label stack is exposed adjacent the label carriers 44 and is secured by suitable unshown fingers adjacent the exposed label peiphery to thereby permit the aligned label carrier vacuum cup 56 to receive the label in the manner previously described.

With reference to FIGS. 3, 4, and 6, the label magazine mount 54 is adjustable to fixedly mount the label magazines 26 on the base 24 in an adjustable manner that controls the locations at which the labels are received by the vacuum cups 56 on the label carriers 44 and the ultimate locations at which the labels are received by the mold. This adjustable mount 54 for the label magazines includes a lower plate 62 that is secured to the base 24 by slotted bolt connections 63 (FIG. 3) that permit side to side adjustment. A plate 64 (FIG. 6) extends upwardly from plate 62 and is secured by bolts 65. Another vertically extending plate 66 has horizontal slotted bolt connections 67 (FIGS. 4 and 6) to plate 64 and also has vertical slotted bolt connections 68 to a downwardly extending plate 70 on which a horizontally extending upper plate 72 is supported and secured by bolts 74 (FIGS. 3 and 6). Adjustment of the connections 63, 67, and 68 provides three dimensional adjustment between the lower and upper horizontal plates 62 and 72 to provide label magazine adjustment. Each label magazine 26 is supported on the upper plate 72 by a plurality of associated push-pull nut and bolt connections 78 received within holes and slots 80 (FIG. 3) of the upper plate 72 to permit fine adjustment of the lateral and vertical positions of the label magazines. It should also be mentioned that it is possible to mount all of the label magazines 26 in a fixed relationship with respect to each other and to adjust all of the label magazines together rather than separately. This is possible since the mold locations at which the labels are supplied are fixed and never change with respect to each other such that the same is true for the label magazines.

As previously mentioned, the label transfer mechanism 32 preferably includes the support 36 that pivotally mounts the subbase 34 on the base 24 for pivotal movement about an axis B between the aligned and transfer positions previously described. This pivotal axis B as illustrated in FIG. 3 extends perpendicular to the axis A along with the mold sections 16 are moved toward and away from each other between the open and closed positions. As best illustrated in FIGS. 3 and 4, the first actuator 40 is embodied by an air cylinder 82 having a cylinder body end 84 with a pivotal connection 86 to the base 24 about an axis C. This pivotal connection 86 includes an upstanding lug 88 secured by slot and bolt connections 90 (FIG. 3) to the base 24 and also includes spaced lugs 92 on the cylinder body end 84 on opposite sides of lug 88. A pin 94 of connection 86 extends between the lugs 88 and 92 along axis C to provide the pivotal connection of the air cylinder actuator 40 to the base 24. Another end of the air cylinder actuator 40 includes a piston connecting rod 96 having a pivotal connection 98 to the subbase 34 about an axis D. As best seen in FIG. 3, the connection 98 includes a lug 100 on the end of the rod 96 and a pair of spaced lugs 102 on the subbase 34 on opposite sides of the rod lug 100 with a pin 104 extending therebetween to provide the connection. Extension and retraction of the air cylinder actuator 40 pivots the subbase 34 between the aligned position illustrated by phantom line representation in FIG. 4 and the transfer position illustrated by solid line representation.

As best illustrated in FIG. 3, the first air cylinder actuator 40 includes an adjuster 104 for controlling the extent of retracting and extending movement thereof to thereby control the extent of pivotal movement of the subbase 34 between the aligned and transfer positions and the concomitant movement of the label carriers 44. Adjuster 104 preferably comprises a sleeve 106 through which the piston connecting rod 96 extends. One end of the sleeve 106 is engaged by the adjacent end of the cylinder 82 while the other end thereof is engaged by the lug 100 on the end of the rod 96 in order to limit the retracting movement. The length of the adjuster 106 is selected to provide the proper extent of retracting and extending movement of the air cylinder actuator 40. The slot and bolt connections 90 of the actuator 40 also cooperate with the sleeve 106 to control the positioning of the subbase 34 and the label carriers 44 at the opposite extremes of travel upon retraction and extension of the actuator 40.

Figure 5:
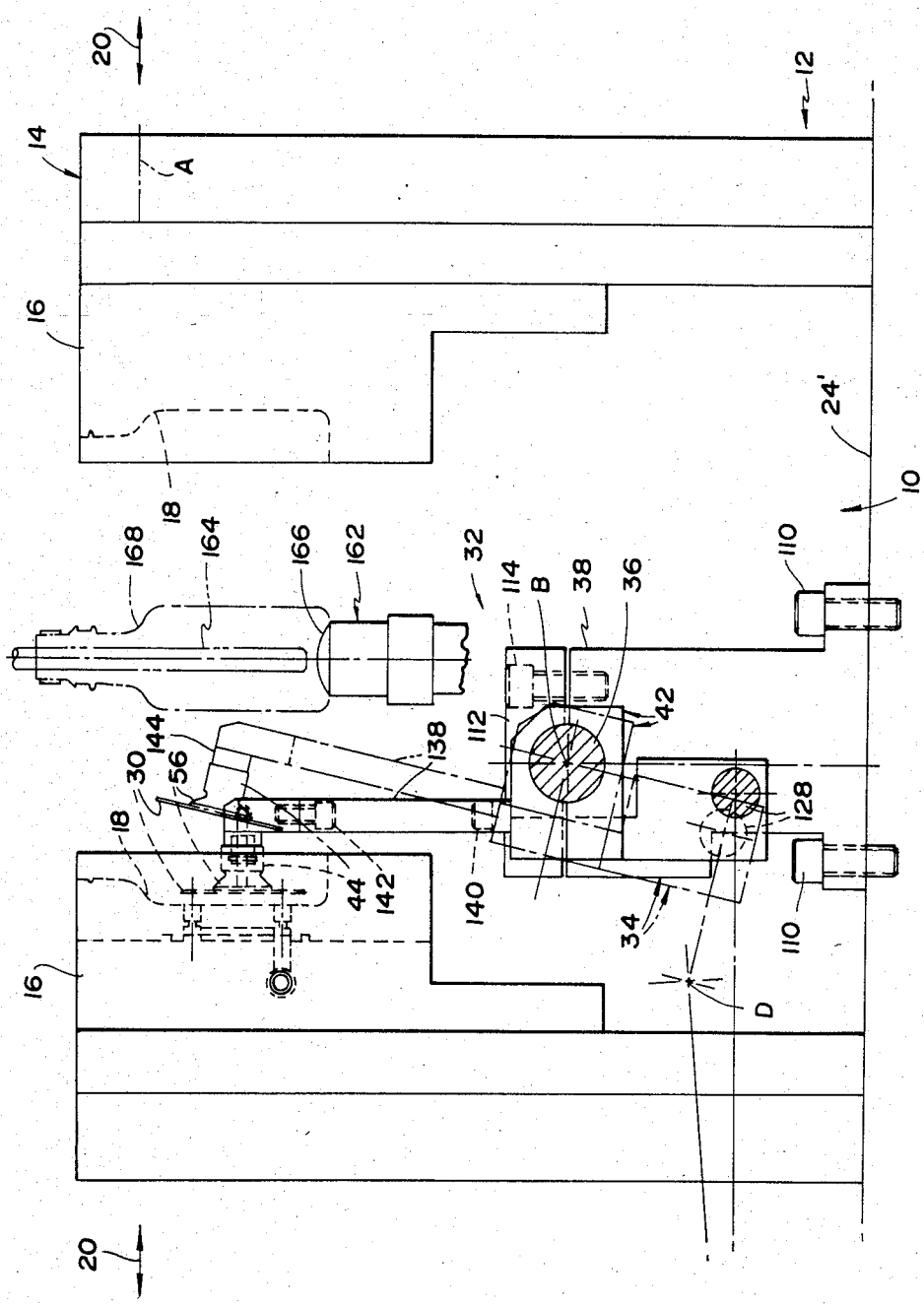
FIG. 5 is an elevation view taken along the direction of 5—5 in FIG. 3 and illustrates the operation of the in-mold label dispenser when the labels are transferred from the label carrier to the mold.

As previously mentioned and best illustrated in FIG. 3, the support 36 has an elongated construction extending along the axis B perpendicular to the axis A along which the mold sections 16 move between the open and closed positions. Support 36 is located at the lower side of the mold 14 in a spaced relationship to the mold as best illustrated in FIG. 5 in order to permit the opening and closing as previously described. One of the mounts 38 for the elongated support 36 is secured by bolts 108 (FIG. 4) to the base 24 on one side of the mold adjacent the first air cylinder actuator 40, while the other mount 38 is secured by bolts 110 (FIG. 5) to a portion 24' of the base on the opposite of the mold. Both of the mounts 38 include upper caps 112 that are secured by associated bolts 114 to secure the elongated support in position in a captured relationship.

As best illustrated in FIG. 6, the shuttle 42 is preferably constructed as a sleeve mounted on the elongated support for pivoting and sliding movement. The second actuator 46 is preferably constructed as an extendable and retractable air cylinder 116 whose cylinder body 117 is secured by bolts 118 to a plate 120 of the subbase 34. Bolts 122 secure the plate 120 to lower ends of connectors 123 whose upper ends have journals 124 through which the elongated support 36 extends. Annular positioners 126 on the elongated support 36 are adjustably clamped in position by associated bolts 127 in slidable engagement with the journals 124 to thereby adjustably control the positioning of the second air cylinder actuator 46 along its length. Adjacent the left end of plate 120, the second air cylinder actuator 46 has a piston connecting rod 128 whose end 130 constitutes the other end of this actuator and is secured by a threaded connector 132 to one end of a plate 134 whose other end is secured by bolts 136 to the sleeve shuttle 42. Such connection of the sleeve shuttle 42 to the second air cylinder actuator 46 provides pivoting of the shuttle with the subbase 34 about the support 36 between the aligned and transfer positions and also slides the shuttle along the support between the withdrawn and inserted positions during the retraction and extension of the rod 128. The stroke length of the second air cylinder actuator is the same as the spacing between the mold cavity sections 18 and the label magazines 26 such that movement of the rod 128 to its opposite extremes of travel positions the shuttle 42 in the withdrawn and inserted positions where the label carriers are respectively aligned with the label magazines and the mold cavity sections. Such positioning of the shuttle is adjustably controlled by the adjustability previously described.

As illustrated in FIG. 6, a plastic bracket 138 has a lower end secured by bolts 140 to the shuttle 42 and has an upper end secured by bolts 142 to a plastic label carrier member 144. As illustrated in FIG. 3, label carrier member 144 has an elongated construction with each of the label carriers 44 provided thereon as unitary portions thereof with the vacuum cups 56 secured in any suitable manner to the label carriers. An elongated vacuum passage 146 extends from one end of the label carrier member 144 and has passage connections 147 to each of the label carriers 44 and the associated vacuum cups 56 in order to permit the vacuum to be drawn for securing the labels to the label carriers during the transfer operation. It is also possible for compressed air to be supplied to the passage 146 after termination of the vacuum in order to assist in release of the labels to the mold. The one mold section 16 to which the labels are supplied includes a vacuum passage 148 that extends from one end thereof and has vacuum passage connections 150 to the cavity sections 18 in order to secure the labels received from the label carriers 44 in preparation for the blow molding operation. Suitable unshown hoses are connected to the outer ends of passages 146 and 148 to provide the vacuums as discussed.

As illustrated in FIG. 6, a sensor 152 is associated with the second air cylinder actuator 46 to sense the extending movement of the rod 128 and to provide a control signal for indicating that the shuttle 42 is in the inserted position with the label carriers 44 between the open mold sections. This sensor 152 includes a depressable button 154 that is engaged by the plate 134 which connects the cylinder rod 128 with the shuttle 42. Sensor 152 is preferably located on the mount 38 that secures the one end of the elongated support 36 on the opposite side of the mold from the pivotal subbase 34 previously described. Upon extending movement of the air cylinder actuator 46, the rod 128 moves the plate 134 and the shuttle 42 connected thereto toward the left until button 154 is depressed at the termination of the extending movement of the cylinder whereupon the control signal generated commences the movement of the subbase to the transfer position to deposit the labels in the mold.

As illustrated in FIG. 6, the cylinder body 117 of the first air cylinder actuator 46 is mounted on the plate 120 of the subbase 34 by the bolts 118 previously described which are threaded into opposite end fittings 158 and 160 of the cylinder. The one end fitting 160 has the piston connecting rod 128 extending outwardly therethrough for connection by the plate 134 to the shuttle 42 in the manner previously described. The second air cylinder actuator 46 extends parallel to the axis B of the elongated support 36 on the opposite side thereof as the label carriers 44 such that the retraction and extension of its rod 128 moves the shuttle 42 along the elongated support in the manner previously described.

As illustrated in FIGS. 4 and 5, the elongated support 36 extends horizontally such that its axis B extends horizontally in order to permit use of the label dispenser with molds whose sections move horizontally along the axis A (FIG. 5) between the open and closed positions. The label carriers 44 project upwardly from the shuttle 42 as illustrated in FIG. 6 by virtue of the mounting thereof on the plastic bracket 138 and on the plastic member 144. Such mounting of the label carriers on plastic components prevents mold damage by fracturing of the plastic in case the mold is closed with the label carriers in the inserted position. The first air cylinder actuator 40 has its connection 98 to the subbase 34 located below the elongated support 36 as best illustrated in FIG. 4 on the opposite side thereof as the label carriers 44. Thus, extension of the air cylinder actuator 40 pushes on the subbase 34 and thereby moves the label carriers 44 from the phantom line position to the solid line position to engage the adjacent label in the label magazine 26 and to thereafter deposit the label in the mold as previously described. The second air cylinder actuator 46 is located on the subbase 34 also at a position below the elongated support 36 such that the connecting plate 134 extends upwardly from the connecting rod 128 to the shuttle 42 as illustrated in FIG. 6 to provide the connection that moves the shuttle during the extension and retraction of the second air cylinder actuator.

As illustrated in FIG. 5, the molding machine 12 includes a transfer pedestal 162 and a stretch rod 164. The top surface 166 of the pedestal 162 cooperates with the cavity sections to define the bottom of the associated mold cavity in the closed position. Stretch rod 164 and pedestal 162 cooperate to position the hot parison within the mold cavity prior to blowing and thereafter cooperate to transfer the blow molded article such as the small bottle 168 illustrated from between the mold sections in a conventional manner for ultimate delivery with the label already attached thereto by the in-mold labeling operation as previously described.

While the best mode for carrying out the invention has been described in detail, those familiar with the art to which this invention relates will recognize various alternative designs and embodiments for carrying out the invention as defined by the following claims.

What is claimed is:

1. An in-mold label dispenser for a plastic blow molding machine including a mold having a pair of mold sections each of which includes a cavity section, and said mold sections being movable toward and away from each other between an open position spaced from each other and a closed position where the cavity sections thereof cooperate to define an enclosed cavity in which blow molding is performed, the in-mold label dispenser comprising: a base; at least one label magazine mounted on the base adjacent the mold; a label transfer mechanism including a subbase movably mounted on the base; a first actuator that extends between the base and the subbase to move the subbase between an aligned position with respect to the open mold sections and a transfer position; a shuttle mounted for movement with the subbase under the impetus of the first actuator and for movement with respect thereto toward and away from the mold; at least one label carrier mounted on the shuttle in a fixed relationship with respect thereto and being operable to carry a label for transfer from the label magazine to the mold; a second actuator mounted for movement on the subbase and being connected to the shuttle to move the shuttle between withdrawn and inserted positions with respect to the mold; said shuttle with the label carrier fixed thereon being located adjacent the label magazine in the withdrawn position where operation of the first actuator moves the subbase and the shuttle with the label carrier fixed thereto between the mold aligned and transfer positions to permit the label carrier to receive a label from the label magazine; the second actuator then moving the shuttle to the inserted position with the subbase in the aligned position to position the label carrier fixed on the shuttle and the label carried by the label carrier between the mold sections of the open mold; the first actuator thereafter moving the subbase and the shuttle thereon with the label carrier fixed to the shuttle to the transfer position to transfer the label on the label carrier of the shuttle to one of the mold sections prior to movement of the subbase and the shuttle thereon with the label carrier fixed to the shuttle back to the aligned position under the impetus of the first actuator which is followed by movement of the shuttle and the label carrier fixed thereon back to the withdrawn position in preparation for the next cycle; and a control for coordinating the operation of the first and second actuators to transfer at least one label from the label magazine to the mold during each blow molding cycle of the machine.

2. An in-mold label dispenser as in claim 1 which includes a plurality of label magazines and a plurality of label carriers so as to supply labels to a multiple cavity type mold of the blow molding machine.

3. An in-mold label dispenser as in claim 2 wherein the label magazines are fixedly mounted on the base and located so as to supply labels to the label carriers on the shuttle upon movement of the subbase from the aligned position to the transfer position with the shuttle in the withdrawn position with respect to the mold.

4. An in-mold label dispenser as claim 2 or 3 which includes an adjustable mount for fixedly mounting the label magazines on the base to control the location at which the labels are received by the label carriers and the ultimate locations at which the labels are received by the mold.

5. An in-mold label dispenser as in claim 2 or 3 which includes a support that pivotally mounts the subbase on the base for pivotal movement between the aligned and transfer positions.

6. An in-mold label dispenser as in claim 5 wherein the first actuator comprises an air cylinder having one end connected to the base and another end connected to the subbase and being retractable and extendable to pivot the subbase about the support between the aligned and transfer positions.

7. An in-mold label dispenser as in claim 6 wherein the first air cylinder actuator includes an adjuster for controlling the extent of retracting and extending movement thereof to thereby control the extent of pivotal movement of the subbase between the aligned and transfer positions and the concomitant movement of the label carriers.

8. An in-mold label dispenser as in claim 6 wherein the support has an elongated construction extending across the mold on one side thereof in a spaced relationship to the mold, the shuttle being mounted on the elongated support for pivoting and sliding movement, and the second actuator being an extendable and retractable air cylinder having one connected to the subbase and another end connected to the shuttle such that the shuttle pivots with the subbase about the support between the aligned and transfer positions and also slides along the support between the withdrawn and inserted positions during its retraction and extrusion.

9. An in-mold label dispenser as in claim 8 wherein the second air cylinder actuator includes a sensor for sensing the extension thereof to provide a control signal for indicating that the shuttle is in the inserted position with the label carriers between the open mold sections.

10. An in-mold label dispenser as in claim 9 wherein the elongated support includes opposite end mounts for providing mounting thereof on the base on opposite sides of the mold, and the sensor of the second air cylinder actuator being located on the mount on the opposite side of the mold from the pivotal subbase.

11. An in-mold label dispenser as in claim 7 wherein the first air cylinder actuator is connected to the subbase on the opposite side of the support from the label carriers.

12. An in-mold label dispenser as in claim 11 wherein the second air cylinder actuator extends parallel to the support on the opposite side thereof as the label carriers.

13. An in-mold label dispenser as in claim 12 wherein the second air cylinder actuator includes a cylinder body mounted on the subbase and also includes a piston connecting rod that extends from the cylinder body to the shuttle.

14. An in-mold label dispenser as claim 13 wherein the elongated support extends horizontally with the label carriers projecting upwardly from the shuttle above the elongated support and with the second air cylinder actuator located below the elongated support.

15. An in-mold label dispenser for a plastic blow molding machine including a mold having a pair of mold sections each of which includes a plurality of cavity sections, and said mold sections being movable toward and away from each other between an open position spaced from each other and a closed position where the cavity sections thereof cooperate to define enclosed cavities in which blow molding is performed, the in-mold label dispenser comprising: a base; a plurality of label magazines mounted on the base adjacent the mold; a label transfer mechanism including a subbase movably mounted on the base; a first air cylinder actuator that extends between the base and the subbase to move the subbase between an aligned position with respect to the open mold sections and a transfer position; a shuttle mounted for movement with the subbase under the impetus of the first actuator and for movement with respect thereto toward and away from the mold; a plurality of label carriers mounted on the shuttle in a fixed relationship with respect thereto and being operable to carry labels for transfer from the label magazines to the mold; a second air cylinder actuator mounted for movement on the subbase and being connected to the shuttle to move the shuttle between withdrawn and inserted positions with respect to the mold; said shuttle with the label carriers fixed thereon being located adjacent the label magazines in the withdrawn position where operation of the first air cylinder actuator moves the subbase and the shuttle with the label carriers fixed thereto between the mold aligned and transfer positions to permit the label carriers to receive labels from the label magazines; the second air cylinder actuator then moving the shuttle to the inserted position with the subbase in the aligned position to position the label carriers fixed on the shuttle and the labels carried by the label carriers between the mold sections of the open mold; the first air cylinder actuator thereafter moving the subbase and the shuttle thereon with the label carriers fixed to the shuttle to the transfer position to transfer the labels on the label carriers fixed on the shuttle to one of the mold sections prior to movement of the subbase and the shuttle thereon with the label carriers fixed to the shuttle back to the aligned position under the impetus of the first air cylinder actuator which is followed by movement of the shuttle and the label carriers fixed thereon back to the withdrawn position in preparation for the next cycle; and a control for coordinating the operation of the first and second air cylinder actuators to transfer labels from the label magazines to the cavity sections of the mold during each blow molding cycle of the machine.

16. An in-mold label dispenser for a plastic blow molding machine including a mold having a pair of mold sections each of which includes a plurality of cavity sections, and said mold sections being movable toward and away from each other between an open position spaced from each other and a closed position where the cavity sections thereof cooperate to define enclosed cavities in which blow molding is performed, the in-mold label dispenser comprising: a base; a plurality of label magazines mounted in fixed locations on the base adjacent the mold; a label transfer mechanism including a subbase pivotally mounted on the base; a first air cylinder actuator that extends between the base and the subbase and is extendable and retractable to move the subbase between an aligned position with respect to the open mold sections and a transfer position; a shuttle mounted for movement with the subbase under the impetus of the first actuator and for movement with respect thereto toward and away from the mold; a plurality of label carriers mounted on the shuttle in a fixed relationship with respect thereto and being operable to carry labels for transfer from the label magazines to the mold; a second air cylinder actuator mounted for movement on the pivotal subbase and being connected to the shuttle to move the shuttle between withdrawn and inserted positions with respect to the mold; said shuttle with the label carriers fixed thereon being located adjacent the label magazines in the withdrawn position where operation of the first air cylinder actuator moves the subbase and the shuttle with the label carriers fixed thereto between the mold aligned and transfer positions to permit the label carriers to receive labels from the label magazines upon movement of the subbase from the aligned position to the transfer position under the impetus of the first air cylinder actuator prior to movement back to the aligned position; the second air cylinder actuator then moving the shuttle to the inserted position with the subbase in the aligned position to position the label carriers fixed on the shuttle and the labels carried by the label carriers between the mold sections of the open mold; the first air cylinder actuator thereafter moving the subbase and the shuttle thereon with the label carriers fixed to the shuttle to the transfer position to transfer the labels on the label carriers fixed on the shuttle to one of the mold sections prior to movement of the subbase and the shuttle thereon with the label carriers fixed to the shuttle back to the aligned position under the impetus of the first air cylinder actuator which is followed by movement of the shuttle and the label carries fixed thereon back to the withdrawn position in preparation for the next cycle; and a control for coordinating the operation of the first and second air cylinder actuators to transfer labels from the label magazines to the cavity sections of the mold during each blow molding cycle of the machine.

17. An in-mold label dispenser for a blow molding machine including a mold having a pair of mold sections each of which includes a plurality of cavity sections, and said mold sections being movable toward and away from each other between an open position spaced from each other and a closed position where the cavity sections thereof cooperate to define enclosed cavities in which blow molding is performed, the in-mold label dispenser comprising: a base; a plurality of label magazines mounted in fixed locations on the base adjacent the mold; a label transfer mechanism mounted on the base and including an elongated support that extends transverse to the direction of opening and closing movement of the mold sections across the mold on one side thereof in a spaced relationship thereto; a pivotal subbase mounted at a fixed location along the length of the elongated support for pivotal movement between aligned and transfer positions with respect to the mold; a shuttle that pivots with the pivotal subbase and is movable longitudinally along the elongated support toward and away from the mold; a plurality of label carriers mounted on the shuttle in a fixed relationship with respect thereto and being operable to carry labels for transfer from the label magazines to the open mold; a first air cylinder actuator extending between the base and the subbase and being operable to pivot the subbase on the support between the aligned and transfer positions; a second air cylinder actuator mounted on the subbase for pivotal movement therewith; said second air cylinder actuator extending between the subbase and the shuttle and being operable to move the shuttle along the support between withdrawn and inserted positions with respect to the open mold; the label carriers fixed on the shuttle being located adjacent the label magazines in the withdrawn position of the shuttle to receive labels therefrom upon pivoting of the subbase and the shuttle thereon with the label carriers fixed on the shuttle from the aligned position to the transfer position and the back to the aligned position under the impetus of the first air cylinder actuator; the label carriers fixed on the shuttle with the labels on the label carriers being movable to between the mold sections of the open mold by movement of the shuttle to the inserted position under the impetus of the second air cylinder actuator whereupon pivoting of the subbase and the shuttle thereon with the label carriers fixed on the shuttle from the aligned position to the transfer position deposits the labels in the cavity sections of the mold prior to pivoting of the subbase and the shuttle thereon with the label carriers fixed on the shuttle back to the aligned position under the impetus of the first air cylinder actuator which is followed by movement of the shuttle and the label carriers fixed thereon back to the withdrawn position under the impetus of the second air cylinder actuator; and a control for coordinating the operation of the first and second air cylinder actuators to transfer labels from the label magazines to the cavity sections of the mold during each blow molding cycle of the machine.

18. An in-mold label dispenser for a blow molding machine including a mold having a pair of mold sections each of which includes a plurality of cavity sections, and said mold sections being movable horizontally toward and away from each other between an open position spaced from each other and a closed position where the cavity sections thereof cooperate to define enclosed cavities in which blow molding is performed, the in-mold label dispenser comprising: a base; a plurality of label magazines mounted in fixed locations on the base adjacent the mold; a label transfer mechanism mounted on the base and including an elongated support that extends horizontally transverse to the direction of opening and closing movement of the mold sections below the mold in a spaced relationship thereto; a pivotal subbase mounted at a fixed location along the length of the elongated support for pivotal movement between aligned and transfer positions with respect to the mold; a shuttle that pivots with the pivotal subbase and is movable longitudinally along the elongated support toward and away from the mold; a plurality of label carriers mounted on the shuttle in a fixed relationship with respect thereto on the upper side of the support and being operable to carry labels for transfer from the label magazines to the open mold; a first air cylinder actuator having one end connected to the base and having another end connected to the subbase on the lower side of the support; the first air cylinder actuator being extendable and retractable to pivot the subbase on the support between the aligned and transfer positions; a second air cylinder actuating mounted on the subbase for pivotal movement therewith on the lower side of the support; said second air cylinder actuator extending horizontally between the subbase and the shuttle and being extendable and retractable to move the shuttle horizontally along the support between withdrawn and inserted positions with respect to the open mold; the label carriers fixed on the shuttle being located adjacent the label magazines in the withdrawn position of the shuttle to receive labels therefrom upon pivoting of the subbase and the shuttle thereon with the label carriers fixed on the shuttle from the aligned position to the transfer position and then back to the aligned position under the impetus of the first air cylinder actuator; the label carriers fixed on the shuttle with the labels the label carriers being movable to between the mold sections of the open mold by movement of the shuttle to the inserted position under the impetus of the second air cylinder actuator whereupon pivoting of the subbase and the shuttle thereon with the label carriers fixed on the shuttle from the aligned position to the transfer position deposits the labels in the cavity sections of the mold prior to pivoting of the subbase and the shuttle thereon with the label carriers fixed on the shuttle back to the aligned position under the impetus of the first air cylinder actuator which is followed by movement of the shuttle and the label carriers fixed thereon back to the withdrawn position under the impetus of the second air cylinder actuator; and a control for coordinating the operation of the first and second air cylinder actuators to transfer labels from the label magazines to the cavity sections of the mold during each blow molding cycle of the machine.

* * * * *

UNITED STATES PATENT AND TRADEMARK OFFICE
CERTIFICATE OF CORRECTION

PATENT NO. : 4,585,408

DATED : April 29, 1986

INVENTOR(S) : Richard C. Darr

It is certified that error appears in the above-identified patent and that said Letters Patent is hereby corrected as shown below:

Column 4, lines 14 and 15, delete "actuator pivots the shuttle with the subbase about the";

Column 5, lines 66 and 67, delete "respect thereto and are operable to transfer labels 30 from";

Column 6, line 9, "labels" should be --label--;

Column 6, line 13, "cavities" should be --cavity--;

Column 7, line 63, "with" should be --which--;

Column 11, line 43, claim 4, after "as" insert --in--;

Column 12, line 4, claim 8, after "one" insert --end--;

Column 12, line 33, claim 14, after "as" insert --in--;

Column 14, line 2, claim 16, "carries" should be --carriers--;

Column 14, line 46, claim 17, "the" should be --then--;(1st occ.)

Column 15, line 28, claim 18, "actuating" should be --actuator--;

Column 16, line 12, claim 18, after "labels" insert --on--.

Signed and Sealed this

Fourth Day of November, 1986

[SEAL]

Attest:

DONALD J. QUIGG

Attesting Officer

Commissioner of Patents and Trademarks